US009591859B2

(12) United States Patent
Leenen et al.

(10) Patent No.: US 9,591,859 B2
(45) Date of Patent: Mar. 14, 2017

(54) METHOD AND DEVICE FOR SEPARATING MEAT FROM BONE PARTS (71) Applicant: MAREL MEAT PROCESSING B.V., Oss (NL)

(72) Inventors: Gerardus Frederikus Jozef Leenen, Bergen (NL); Franciscus Theodorus Henricus Johannes Van Der Steen, Megen (NL)

(73) Assignee: Marel Meat Processing B.V., Oss (NL)

( * ) Notice: Subject to any disclaimer, the term of this patent is extended or adjusted under 35 U.S.C. 154(b) by 0 days.

(21) Appl. No.: 14/904,523

(22) PCT Filed: Jul. 11, 2014

(86) PCT No.: PCT/NL2014/050478
§ 371 (c)(1),
(2) Date: Jan. 12, 2016

(87) PCT Pub. No.: WO2015/005792
PCT Pub. Date: Jan. 15, 2015

(65) Prior Publication Data
US 2016/0165907 A1   Jun. 16, 2016

(30) Foreign Application Priority Data
Jul. 12, 2013   (NL) .................................... 2011152

(51) Int. Cl.
A22C 17/00   (2006.01)
A22C 17/04   (2006.01)

(52) U.S. Cl.
CPC .................................... *A22C 17/04* (2013.01)

(58) Field of Classification Search
CPC .. A22C 17/04; A22C 21/0076; A22C 21/0084
USPC ......................................................... 452/138
See application file for complete search history.

(56) References Cited

U.S. PATENT DOCUMENTS

| 4,025,985 A | * | 5/1977 | Rousseau | A22C 17/04 452/138 |
| 4,141,113 A | * | 2/1979 | Van Bergen | A22C 17/04 241/68 |
| 4,538,324 A | | 9/1985 | Prosenbauer | |
| 4,575,899 A | * | 3/1986 | Prosenbauer | A22C 17/04 209/300 |
| 4,649,600 A | * | 3/1987 | Langen | A22C 17/04 452/138 |

(Continued)

FOREIGN PATENT DOCUMENTS

AT   368362 B   10/1982
DE   2437618 A1   2/1976
(Continued)

*Primary Examiner* — Richard Price, Jr.
(74) *Attorney, Agent, or Firm* — Zarley Law Firm, P.L.C.

(57) ABSTRACT

The invention relates to a method for separating meat from bone parts, comprising the successive method steps of: placing the bone parts in a press; exerting a pressure on the bone parts so that meat is separated from the bones; re-orienting the bone parts; and exerting a pressure on the re-oriented bone parts again. The invention also relates to a device for separating meat from bones by subjecting the bones to a pressure.

16 Claims, 7 Drawing Sheets

(56) References Cited

U.S. PATENT DOCUMENTS 6,132,304 A * 10/2000 Aarts ..................... A22C 17/04
452/138
7,896,730 B2 * 3/2011 Lesar ................... A22C 17/004
452/138

FOREIGN PATENT DOCUMENTS

| DE | 2630325 | A1 | 1/1978 |
| GB | 2016258 | A | 9/1979 |
| WO | 9804141 | A1 | 2/1998 |

* cited by examiner

METHOD AND DEVICE FOR SEPARATING MEAT FROM BONE PARTS

BACKGROUND OF THE INVENTION

The invention relates to a method for separating meat from bone parts by pressing bone parts, having residual meat particles on them, in a bone press. The invention also relates to a device for separating meat from bones by subjecting bones with residual meat to a pressure.

In the processing of carcasses, meat is removed from the bones in various steps. In a later stage, when the bigger meat parts have already been cut off the carcasses, bones are left with residual meat particles still attached to them. These bones with residual meat particles may subsequently be placed in a bone press and be subjected to a substantive pressure. Under influence of the pressure exerted, residual meat particles will come loose from the bones and the released meat particles will flow out of the bone press through a filter while the bones remain in the bone press. The released meat material in the form of a more or less viscous meat mass can then be collected and, depending on the quality, further processed for instance for snacks or pet food. Higher quality meat material obtained using the invention may be used directly for human consumption.

The German Offenlegungsschrift DE 26 30 325 discloses a method for mechanical deboning of meat containing bones. The meat containing bones (pig or cow) are forwarded to a bone press where the bones are pressed during a first pressing step in a pressure chamber with a pressure of 240-260 atmosphere. The bones that remain after the first pressing step are removed from the bone press and then—via a conveyor—brought back in the same pressure chamber and pressed again under an enhanced pressure of approximately 300-320 atmosphere.

The UK patent application GB 2 06 258 discloses an apparatus and process for separating meat scraps from bones. The driving of a press-piston may be carried out in more than two phases. The piston may for example be moved from an initial position to an intermediate position, and then be retracted again to the initial position. Subsequently the piston may be moved back again from the initial position along to the intermediate position and then further to its final position. The retraction of the piston from the intermediate position (once or plural times) after an initial pressing step allows the addition of more meat containing bones (an additional charge) to the press-chamber after initial pressing(s). Thus, the degree of charging of the press-chamber increases.

The object of the invention is to provide an improved method and device for separating meat from bone parts by pressing bone parts in a press with enhanced quantity and/or quality of the meat harvested from bone material.

SUMMARY OF THE INVENTION

To realise an enhanced meat harvesting effectivity and/or efficiency the invention provides a method for separating meat from bone parts, comprising the successive method steps of: A) placing the bone parts in a pressure chamber of a bone press; B) exerting a pressure on the bone parts in the pressure chamber of 10-500 bar so that meat is separated from the bones and leaves the pressure chamber; C) re-orienting at least a selection of the bone parts by changing the shape of the pressure chamber; and D) exerting a pressure on the re-oriented bone parts in the pressure chamber of 10-500 bar so that further meat is separated from the bones and leaves the pressure chamber. The enhanced meat harvesting effectivity and/or meat harvesting efficiency is realised due to the re-orientation of at least a selection of the bone parts by changing the shape of the pressure chamber. A changed shape of the pressure chamber is not to be understood as a change of load of a pressure chamber (e.g. an enhanced loading during a second pressure step as disclosed in GB 2 06 258); as the shape of the pressure chamber is not changed with such load variation. More specific, the shape of the pressure chamber may be changed by altering the shape of at least one of the sides of the pressure chamber. Due to the change in shape of the pressure chamber the relative position of the bones will be changed while or during the second pressure step is executed. The second pressure execution will have an enhanced meat harvesting effect if compared to a second pressure execution to the bones as e.g take place in the prior art double bone pressing (see for instance GB 2 06 258) where the relative position of the bones is not changed and enables a simpler processing of the bones compared to when the bones have to be taken out of the press to realise the relative position change of the bones (see for instance DE 26 30 325). The method according the invention thus provides a higher yield of harvested meat within defined meat quality boundaries of at least a few percent when compared to exerting a pressure to the bone parts in a bone press of 10-500 bar without re-orienting the bone parts. Or in other words; while exerting a pressure on the bone parts an agglomeration of bones will build up; such agglomeration of bones is also referred to as a "bone package" or a "bone cake". According to the invention, the structure of the "bone package" will be changed during the subsequent processing.

A further embodiment of the invention is to exert a pressure on the bone parts and to change the shape of the available space for the bone parts in the pressure chamber during the pressing so that the outer shape of the "bone package" changes during the pressing. In other words: the shape of a pressure chamber of the bone press used during method step D) may be changed compared to the shape of the pressure chamber used during method step B). The bone parts may at least partially stay in the bone press after processing step B) while the shape of the for the bone parts available space is changed for the re-orientation in processing step C) and the shape of the available space for the bone parts is changed between the method steps B) and D). The change of the shape of the available space may involve an expansion or a limitation of the available space for the bones or a change of the shape of the pressure chamber includes at least an change of the form of the cross-section of the pressure chamber. It is also possible to combine the processing steps C) and D) to a single method step so that the bone parts are re-oriented while exerting a pressure to the bone parts of 10-500 bar. In this embodiment it is possible—though not required—to maintain the pressure on the bones during the processing while their mutual orientation is changed. As to the enhanced efficiency of the process and due to the requirement not to harvest specific parts of the bones (e.g. bone particles, marrow) the pressure exerted on the bones has to stay below 500 bar. The method also provides the advantages within a pressure scope of 10-500 bar (or below 300 bar, below 250 bar or even below 200 bar). On the other hand to enable the separation of the meat remainders from the bones the pressure exerted on the bones has to exceed at least 10 bar (or to exceed 25 or 50 bar). The pressure levels exerted on the bone parts in step B) and in step D) may be of comparable magnitude, but as an alternative it is also possible to use dissimilar pressure levels exerted on the bone parts in steps B) and D) as long as the pressure levels stay in the range according to the invention.

Not only a single re-orientation (rearrangement) of the bone parts is part of the invention; also one or more additional re-orientations of the bone pans in subsequent processing steps is part of the invention.

An advantage of the meat separation from the bones during processing steps B) and D) taking place in the same bone press is that only a single bone press is to be used to execute the process according the invention saving cost and complexity of installation.

As an alternative, the meat separation from the bones during processing steps B) and D) may also take place in more than one bone press. The advantage of this is that for instance different quality meat grades can be harvested from the different presses, in particular a higher quality grade meat from the first bone press and a lower (though still acceptable) quality grade meat from the second bone press. The meat separated from bone parts during step B) and step D) is then to be collected separately. Also for optimising the production flow dual (or even more than two) subsequent used presses can be beneficial. Although this requires additional technical measures also when using only a single bone press for the meat separation from the bones according the invention it is possible to collect the meat separated from bone parts during step B) and step D) separately.

An embodiment of the invention employs parallel presses in at least one step, i.e. a pressing operation is performed simultaneously (but on different bone charges) in two or more bone presses. The resulting bone packages may be processed together in a single bone press afterwards for a subsequent pressing or be processed in separate presses for the subsequent pressing.

After execution of method step D) the pressure on the bone parts may be decreased and the remaining bone parts may be removed from the bone press for further handling. As an alternative also one or more further subsequent pressing steps may be executed. In a specific embodiment of the method during step A) the bones may be placed into a cylinder shaped pressure chamber with a circumference wall and an end wall; and during method step B) a pressure is generated in the cylinder shaped pressure chamber by means of a main piston movable into the cylinder shaped pressure chamber between a starting position and an extended position of the main piston so that at least a part of the meat attached to the bones is pressed out through holes arranged in at least one of the walls. In the cylinder shaped pressure chamber the bones may be pressed in two subsequent steps while in between the steps (B and D) the bones are mutually re-oriented. Thus, the bones remain in the cylinder shaped pressure chamber between steps B) and D) and the efficiency of the process is enhanced by re-orientation of the bones through an additional element present in the pressing chamber either during the first pressing and/or the second pressing. An example of such additional element for re-orientation is making use of a secondary piston that is movable through a secondary piston aperture in the end wall of the cylinder and/or a secondary piston aperture in the main piston. The secondary piston may be used for exerting pressure during method step D). The main and/or the secondary piston may also be used to press out at least a part of the meat through holes arranged in the main piston, the secondary piston and/or the cylinder. Another option is to use the secondary position in an exerted position during the processing step B) (the first pressing step) and to retract the secondary piston at least partially from the pressure chamber before or during the processing step D) (the secondary pressing step). The position change of the secondary position between the first pressing step and the secondary pressing step realises the shape change of the pressure chamber according the present invention which results in the relative re-orientation of the bone parts.

To enhance the performance of the bone press the meat may be pressed out through apertures in the bone press and at least a part of the apertures may be scraped inbetween subsequent pressing sequences. For instance the main and/or secondary piston may be used for de-blocking the apertures in the bone press, which apertures can be blocked by bone and/or meat particles during operation of the press, by performing a cutting action when passing over the apertures. Thus, a leading edge of the respective piston passes over a mouth of the aperture to remove blocking meat or bones. The mouth of the aperture is the end of the aperture which faces the pressure chamber. Conversely, when the secondary piston retreats into the end wall, the inner circumference of the secondary piston aperture of the end wall acts as a cutting edge similar to the leading edge of the respective pistons, as described earlier, to de-block apertures in the secondary piston.

The invention also provides a device for separating meat from bones by subjecting the bones to a pressure of 10-500 bar (or alternatively to 10-300 bar), comprising: a pressure chamber for holding the bones to be processed; pressure means to selectively change the pressure on the bones in the pressure chamber; and displacement means for at least partially changing the position of individual bones in the pressure chamber relative to other bones. In a specific embodiment the pressure chamber is cylinder shaped with a cylinder wall having a circumference wall and an end wall. The pressure means may comprise a main piston sealingly movable into the cylinder shaped pressure chamber towards and away from the end wall. Also for the separating device different pressure level ranges can be selected; e.g. 25 or 50 bar for the lower pressure level and 250 or 200 bar for the upper pressure level. The device may also comprise a secondary piston that is movable into the cylinder shaped pressure chamber, which secondary piston may have a diameter smaller than the diameter of the cylinder shaped pressure chamber. With such a device the advantages as previously listed in relation to the method according the invention are realised, especially a higher yield of meat that can be separated from the bone parts compared to the prior art separation bone presses.

BREIF DESCRIPTION OF THE FIGURES

The invention is further elucidated on the basis of the non-limitative exemplary embodiment shown in the following figures. Herein shows.

DETAILED DESCRIPTION OF THE PREFERRED EMBODIMENTS

Figure 1A:
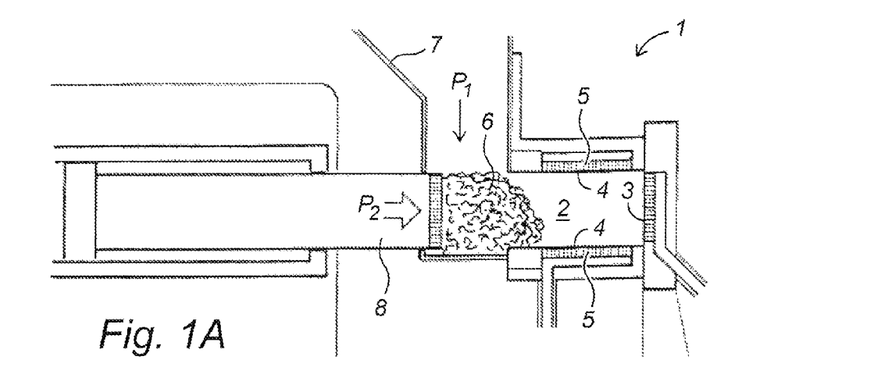
FIGS. 1A-1C three schematic views representing subsequent prior art processing steps of a method for separating meat from bone parts.

FIG. 1A shows a bone press 1 according to the prior art with a cylinder shaped pressure chamber 2 having an end wall 3 and a circumference wall 4. In both, the end wall 3 and the circumference wall 4, through holes 5 (apertures) are arranged for passage of meat that is to be removed from bones 6 processed in the bone press 1. The pressure chamber 2 is connected to a funnel 7 to enable an easy feed (see arrow $P_1$) of the bones 6 to be processed in the bone press 1. After supply of the bones 6 to be processed a main piston 8 can be moved (see arrow $P_2$) into the pressure chamber 2 from a starting position as depicted in FIG. 1A.

Figure 1B:
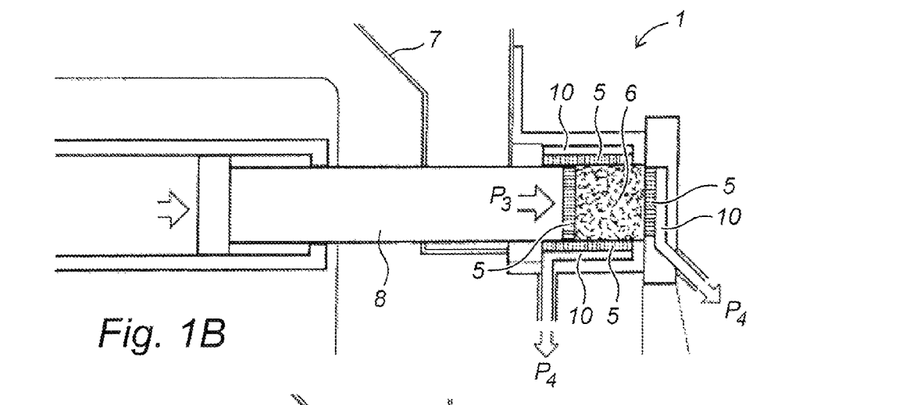

In FIG. 1B the bone press 1 is shown in a position with an extended main piston 8 so that the bones 6 in the pressure chamber 2 are placed under pressure. As a result of the exerted pressure (see arrow $P_3$) meat will be separated from the bones 6 and pass through apertures 5 provided in the end wall 3, the circumference wall 4 and the main piston 8 for this purpose. Via collecting chambers 10 that communicate with the apertures 5 the separated meat can be harvested (see arrows $P_4$).

Figure 1C:
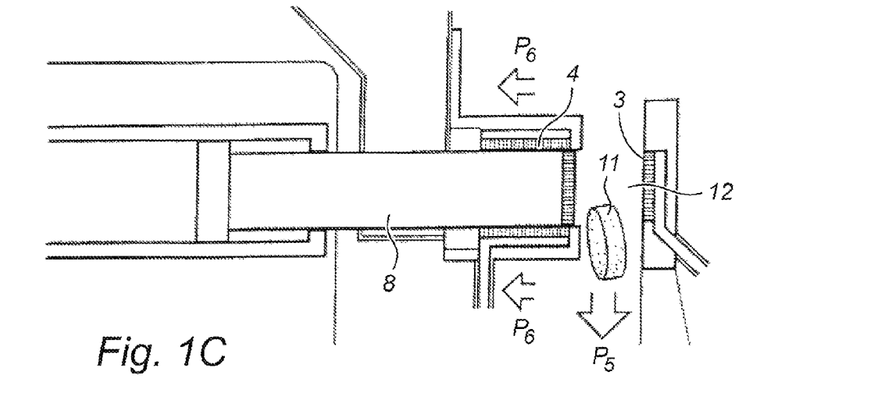

After completion of the pressing of the bones 6 a compressed bone package 11 ("bone cake") remains as shown in FIG. 1C. To remove (see arrow $P_5$) the compressed bone package 11 from the bone press 1 the circumference wall 4 is displaced (see arrows $P_6$) from the end wall 3 of the pressure chamber 2. In a resulting gap 12 between the circumference wall 4 and the end wall 3 the compressed bone package 11 can drop down (see arrow $P_5$). To loosen the compressed bone package 11 from the circumference wall 4 the plunger 8 is moved even further to an end position as illustrated in FIG. 1C.

Figures 2A, 2B:
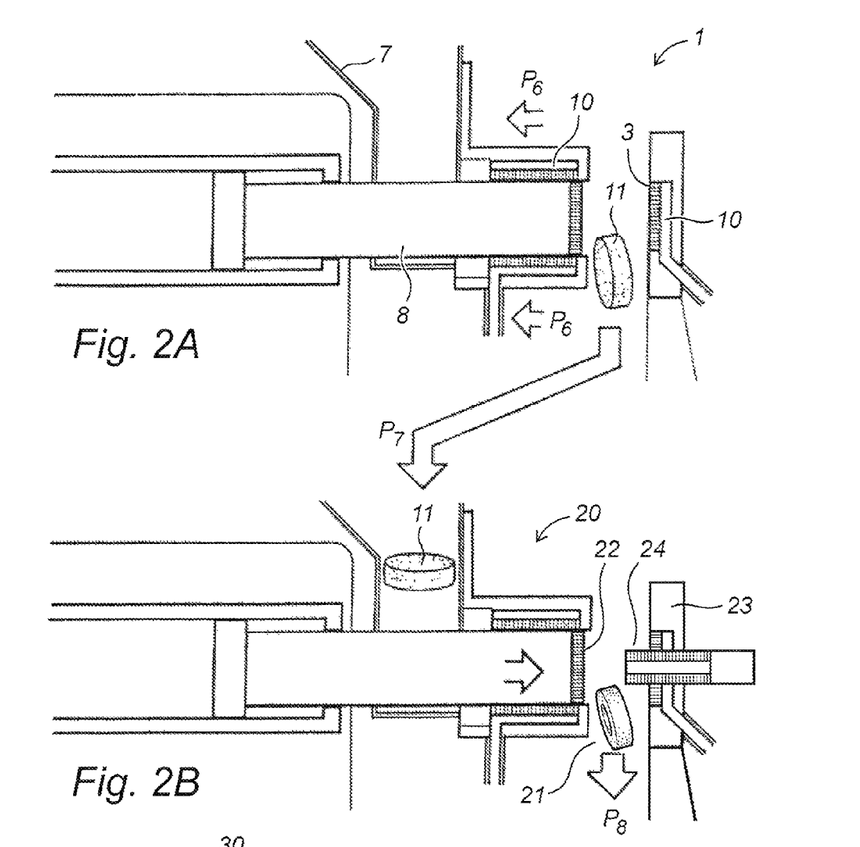
FIGS. 2A and 2B two schematic views representing subsequent processing steps of a method for separating meat from bone parts according to the present invention.

In FIG. 2A the bone press 1 as illustrated in FIG. 1A-1C is depicted again in the situation as also shown in FIG. 1C. After removal of the compressed bone package 11 ("bone cake") from the bone press 1 this already processed compressed bone package 11 is reintroduced (see arrow $P_7$) in a bone press 20 again as depicted in FIG. 2B. The bone press 20 as shown in FIG. 2B can be the same bone press 1 as used for the first compression step shown in FIG. 2A but a pressure chamber 22 of the bone press 20 has a different shape as the pressure chamber 2 of the bone press 1. The end wall 23 of pressure chamber 22 is provided with a projecting part 24 that protrudes, in a closed condition of the bone press 20, in the pressure chamber 22. The result is that the pressure chamber 22 is ring shaped which is different from the shape of the pressure chamber 2 of the bone press 1. The different shape of the pressure chambers 2 and 22 makes that the disk shaped bone package 11 which results from the first pressing in the bone press 1 will deform, due to the projecting part 24 that is part of the end wall 23, to a ring shaped (donut-shaped) bone package 21. The forced shape change of the bone package 11 is initiated by the difference in shape of the pressure chambers 2, 22 and has the effect that the relative mutual position of the bones in the bone package 11 will change A further advantage of the ring shapes pressure chamber 22 is that the maximum distance of the bones to a surface of the pressure chamber 22 is limited and thus that the migration of meat particles loosened from the bones to a wall of the pressure chamber 22 is limited which also is supportive to realise a higher meat harvesting effectively.

Advantageous is that the compressed bone package 11 is introduced in the bone press 20 for the second compression step in an orientation that differs from the orientation in which the compressed bone package 11 was compressed in bone press 1 during the first compression step. A re-oriented compressed bone package 11 for the second compression step results in a further change of the orientation of the bone parts in the compressed bone package 11 (orientation of individual bones with respect to other bones) and thus in enhanced advantages.

As depicted in FIG. 2B the second compression step in the bone press 20 results in a compressed ring shaped bone package 21 (thus being twice compressed) which twice compressed bone package 21 leaving the bone press 20 (see arrow $P_8$) will have a smaller meat content than the (single) compressed bone package 11 remaining after the first compression step.

Figure 3:
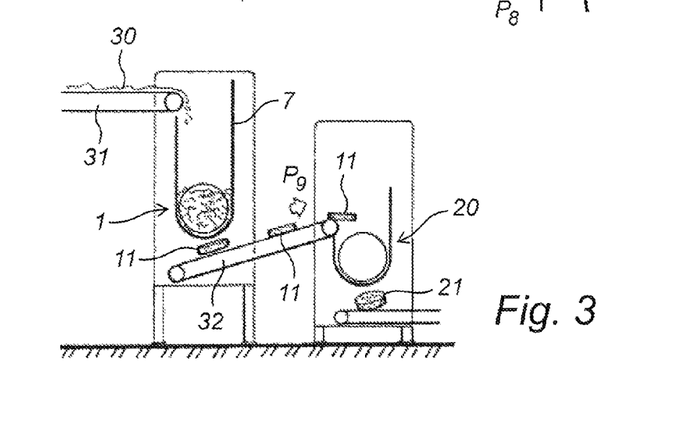
FIG. 3 a schematic view of a cross section of two linked separating devices for performing the method according to the present invention.

In FIG. 3 the bone presses 1 and 20 as referred to in FIGS. 2A and 2B are schematically represented in cross section. The bones to be processed 30 are supplied with a conveyor 31 to the funnel 7 of the first bone press 1. After a first compression step the compressed bone packages 11 will drop on a second conveyor 32 that feeds (see arrow $P_9$) the compressed bone packages 11 to the second press 20 for a second compression step. After the second compression with a differently shaped pressure chamber 22 and a change of the orientation of the bone parts a twice compressed bone package 21 that is then ring shaped is the result (and is fed out of the second bone press 20 for further processing).

Figure 4A:
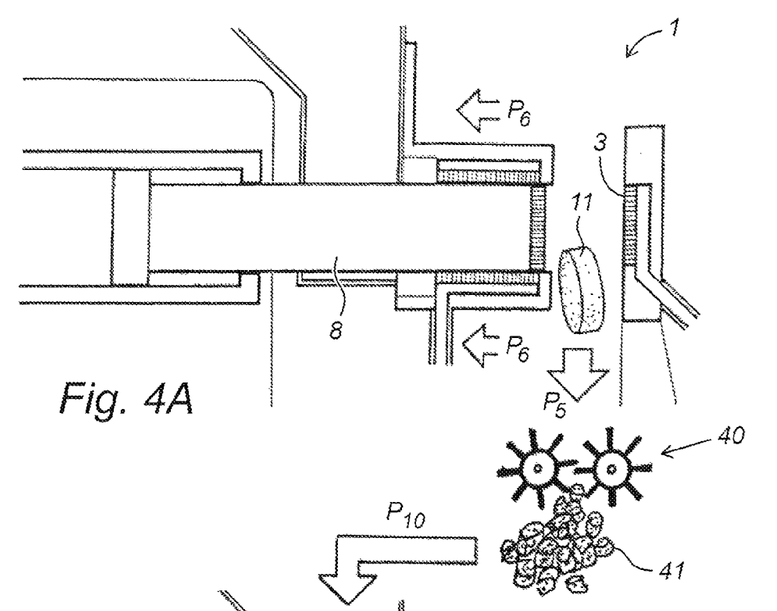
FIGS. 4A and 4B two schematic views of subsequent processing steps of an embodiment of the method for separating meat from bone parts according to the present invention.
Figure 4B:
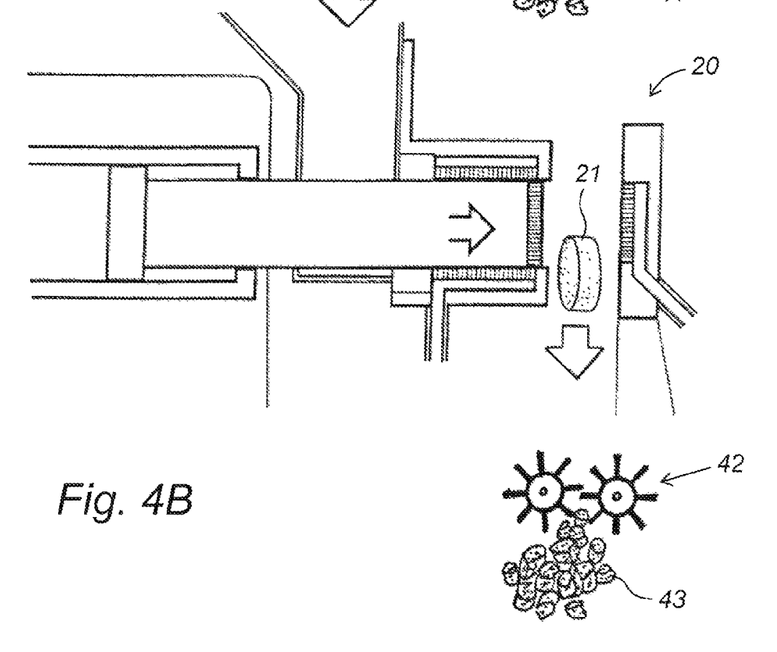

In FIG. 4A the bone press 1 is shown again in the position as depicted in figure 1C. The compressed bone packages 11 dropping (see arrow $P_5$) from the bone press 1 is falling in a fanned wheel set 40 for loosening the bone package 11 to rearrange the mutual position of the bones to a single compressed bone collection 41 before feeding (see arrow $P_{10}$) the bone collection 41 in the reoriented relationship to a second bone press 20 for a second compression step as depicted in FIG. 4B. After the second compression step in the bone press 20 the resulting twice compressed, now ring shaped, bone package 21 may be loosened up again in a second fanned wheel set 42 to a twice compressed bone collection 43 which may be pressed a third time or otherwise processed.

Figure 5A:
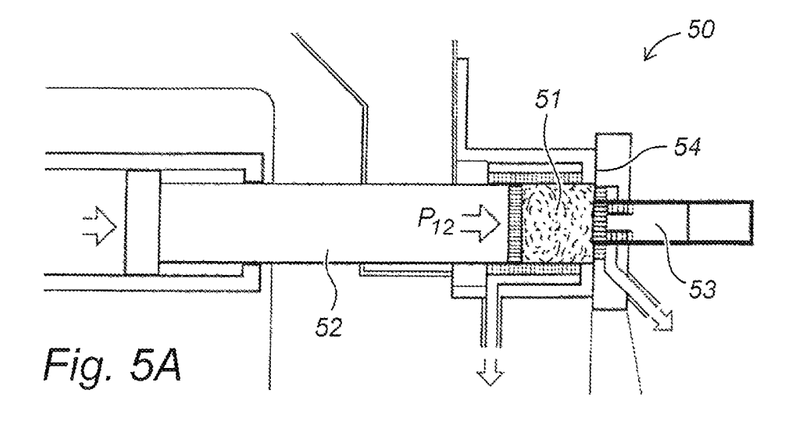
FIGS. 5A-5C three schematic views of subsequent processing steps of an further alternative version of the method for separating meat from bone parts according to the present invention.
Figure 5B:
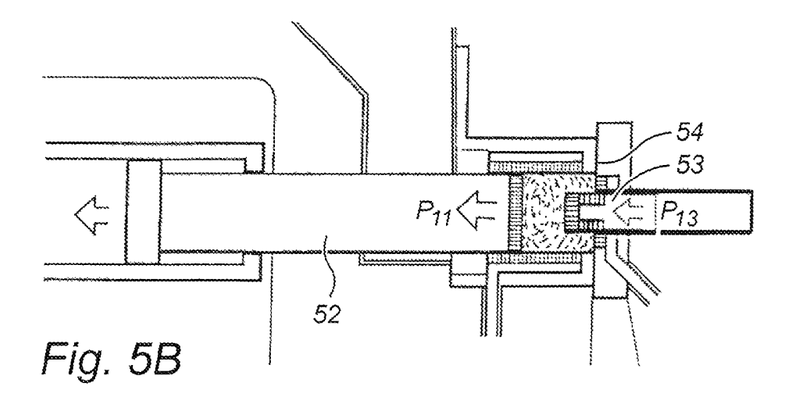
Figure 5C:
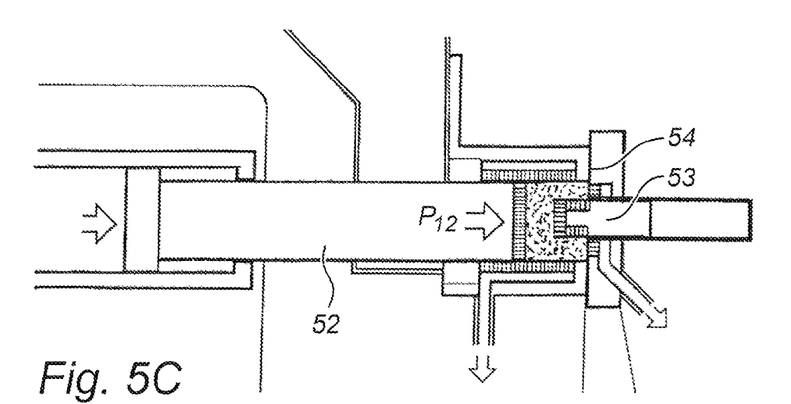

FIG. 5A shows a schematic view of a bone press 50 with a bone mass 51 being compressed in an initial step with a main piston 52 in line with the process as described with reference to FIG. 1B. In a subsequent processing step, see FIG. 5B, the main piston 52 may be displaced in the opposite direction (see arrow $P_{11}$) compared to the compression direction as shown in FIG. 5A (see arrow $P_{12}$). A secondary piston 53 may be moved into the bone mass 51. As shown in FIG. 5A the secondary piston 53 is initially not moved into the bone mass 51; in FIG. 5A it is located in end wall 54. As shown in FIG. 5B the secondary piston 53 is subsequently displaced (see arrow $P_{13}$) so that it is influencing the composition of the bone mass 51; the mutual orientation of the bones in the bone mass 51 is thus changed. For further compression the main piston 52 may then be moved in the compression direction again ($P_{12}$); this is depicted in FIG. 5C. The secondary piston 53 may then still be in an extended position (protruding into the bone mass 51). In this process the bone mass 51 stays in the bone press 50 but after a first compression (FIG. 5A) the orientation of the bones in the compressed bone mass 51 is changed with an additional (secondary) piston 53 as is shown in FIGS. 5B and 5C. The pressing of the bone mass 51 may in this example be divided in an initial and a secondary pressing with a lower pressure exerted on the bone mass 51 in between these two compression stages, but as an alternative it is also possible to maintain a high pressure level on the bone mass 51 also in-between the compressions as shown in FIGS. 5A and 5C thus in this alternative the compression being a constant compression process not divided in first and secondary pressing steps but merely a continuous pressing process with interim bone reallocation. As for the dimensions depicted in these FIGS. 5A and 5B; these are just a single option. For instance the thickness of the secondary piston 53 may be varied relative to the other dimensions, as an alternative also a thicker or a thinner secondary piston 53 may be applied.

Figure 6A:
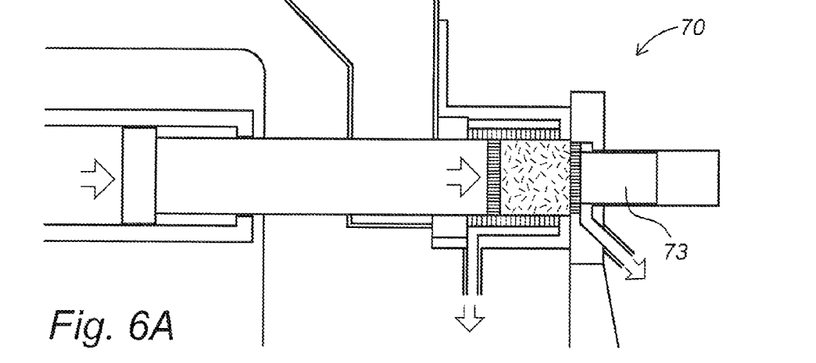
FIGS. 6A-6C three schematic views of subsequent processing steps of a third alternative version of the method for separating meat from bone parts according to the present invention, FIGS. 7A-7C three schematic views of subsequent processing steps of an further alternative version of the method for separating meat from bone parts according to the present invention, and FIG. 8 a schematic three-dimensional view of a separating device according to the present invention.
Figure 6B:
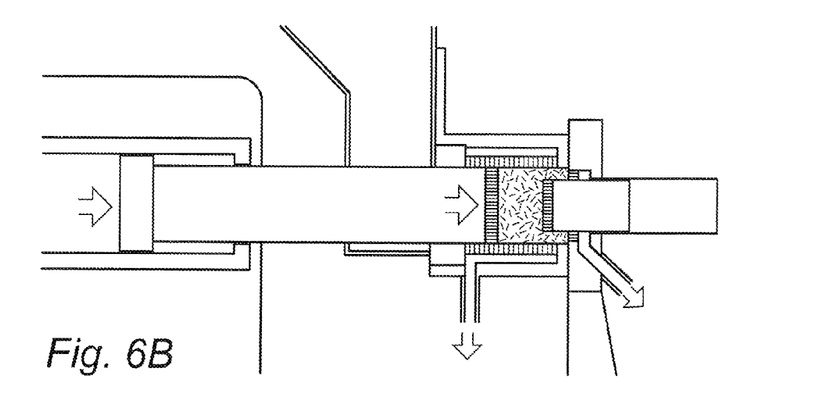
Figure 6C:
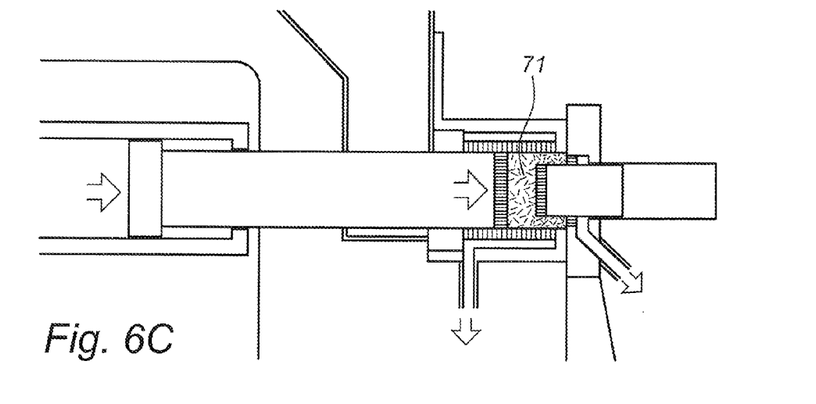

FIGS. 6A-6C show a schematic view of a bone press 70 that of which most parts correspond to the bone press 50 as shown in the FIGS. 5A-5C. The difference of the press 70 over the press SO is that here a secondary piston 73 is shown that is wider than the secondary piston 53 of the press 50. The advantage may be that the shape of the resulting bone mass 71 after the second pressing took place may have "thinner" walls which may be supportive to enhance the processing efficiency.

Figure 7A:
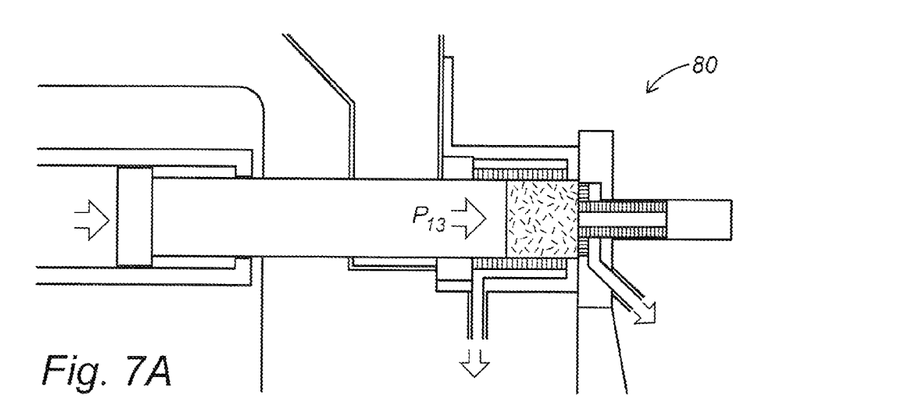
Figure 7B:
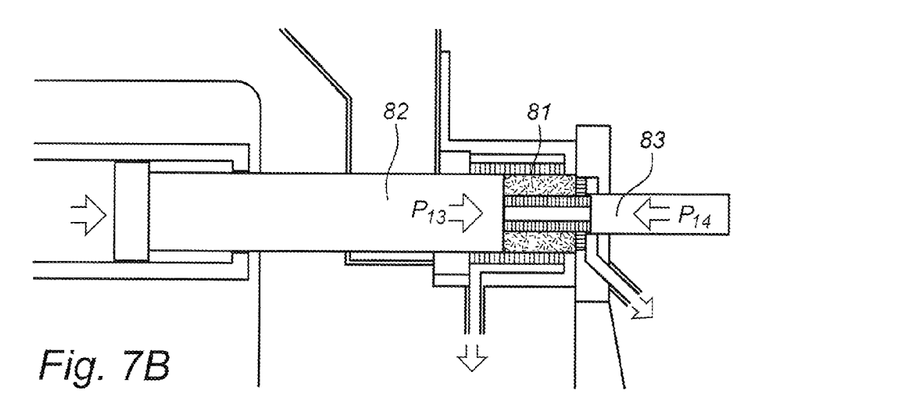
Figure 7C:
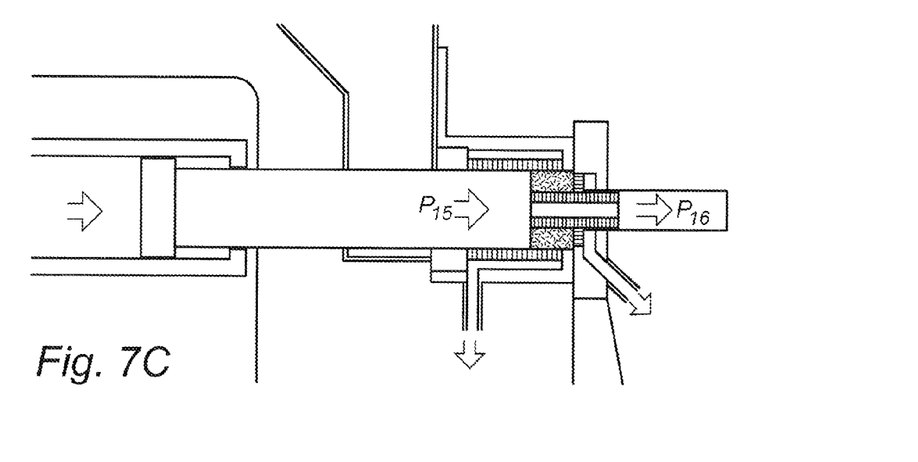

FIGS. 7A-7C show a schematic view of a bone press 80 wherein after the first pressing ($P_{13}$) shown in FIG. 7A a secondary piston 83 is moved ($P_{14}$) into the bone mass 81 until the secondary piston 83 contacts a primary piston 82 (see FIG. 7B). After contacting of the pistons 82, 83 both the pistons 82, 83 are moved in the same direction thus further limiting the remaining space for the bone mass 81. In specific circumstances the processing as shown in this figures may provide advantages.

Figure 8:
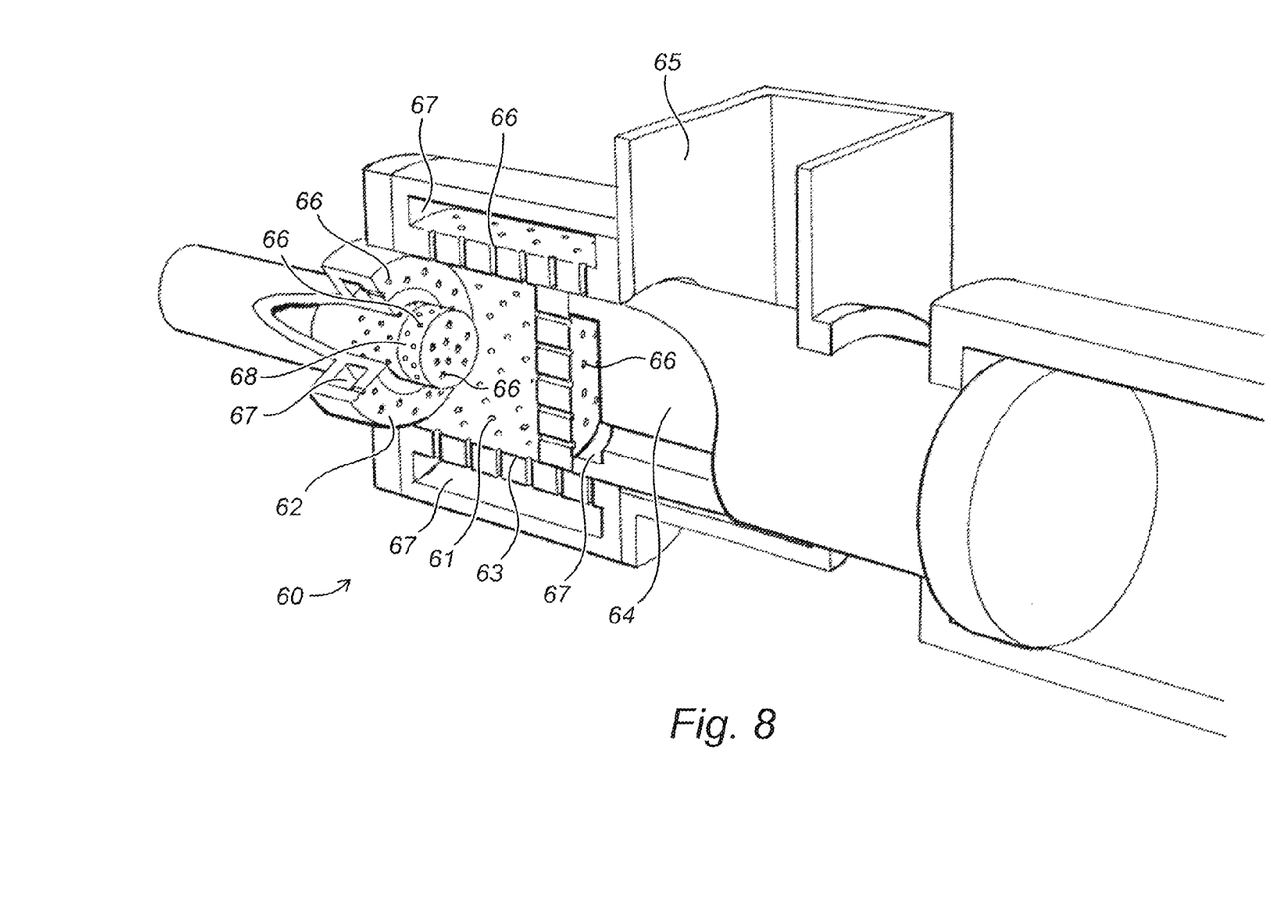

FIG. 8 shows a three-dimensional view of a separating device 60 (bone press) according the invention in line with the process as clarified in relation to FIGS. 5A-5C. The bone press 60 has a pressure chamber 61 bounded by an end wall 62 and a circumference wall 63. In the pressure chamber 61 a main piston 64 is moveable to compress bones fed to the pressure chamber 61 via a feed 65. In the end wall 62, the circumference wall 63 and the main piston 64 through holes 66 are arranged for passage of meat to meat collection chambers 67. In the end wall 62 a secondary piston 68 is situated (also provided with through holes or apertures 66) for re-orientating the orientation of the bones in the pressure chamber 61 in line with the process as described earlier with reference to FIGS. 5A to 5C. The bone press 60 is thus an embodiment of a bone press 50 as shown in FIGS. 5A to 5C. The secondary piston 68 may alternatively be arranged in the circumference wall 63 (this is not shown in the figures) and in a further embodiment of the invention more than one secondary piston may be employed in one bone press pressure chamber (not shown).

The technical features of the invention as illustrated here in the various embodiments of the method and device according the invention are not only disclosed in connection with the other technical features as shown in these examples but are also disclosed individually. Thus combinations of all the individual technical features disclosed with any other individual technical feature disclosed in this application is also to be understood as being disclosed here.

What is claimed:

1. A method for separating meat from bone parts, comprising the successive method steps of:
    A) placing the bone parts in a pressure chamber of a bone press;
    B) exerting a pressure on the bone parts in the pressure chamber of 10-500 bar so that meat is separated from the bones and leaves the pressure chamber;
    C) re-orienting at least a selection of the bone parts by changing the shape of the pressure chamber; and
    D) exerting a pressure on the re-oriented bone parts in the pressure chamber of 10-500bar so that further meat is separated from the bones and leaves the pressure chamber.

2. The method as claimed in claim 1, characterised in that the shape of the pressure chamber is changed by altering the shape of at least one of the sides of the pressure chamber.

3. The method as claimed in claim 1, characterised in that the pressure on the bone parts in the pressure chamber exerted during processing step B) is decreased before the bone parts are re-oriented in processing step C).

4. The method as claimed in claim 1, characterised in that the bone parts are at least partially removed from the bone press after processing step B) for the re-orientation in processing step C).

5. The method as claimed in claim 1, characterised in that the meat separation from the bones during processing steps B) and D) takes place in the same bone press.

6. The method as claimed in claim 5, characterised in that the method steps C) and D) are combined in a single method step.

7. The method as claimed in claim 1, characterised in that the bone parts at least partially stay in the pressure chamber after processing step B) while the space available for the bone parts is changed between the method steps B) and D).

8. The method as claimed in claim 1, characterised in that the change of the shape of the pressure chamber includes at least an change of the form of the cross-section of the pressure chamber.

9. The method as claimed in claim 1, characterised in that the meat separation from the bones during processing steps B) and D) takes place in separate pressure chambers having different shapes.

10. The method as claimed in claim 1, characterised in that during method step A) the bones are placed into a cylinder shaped pressure chamber with a circumference wall and an end wall; and during method step B) a pressure is generated in the cylinder shaped pressure chamber by means of a main piston movable into the cylinder shaped pressure chamber between a starting position and an extended position of the main piston so that at least a part of the meat attached to the bones is pressed out through holes arranged in at least one of the walls.

11. The method as claimed in claim 10, characterised in that during method step D) a pressure is exerted by operating a secondary piston movable through an aperture in the end wall of the cylinder shaped pressure chamber.

12. The method as claimed in claim 10, characterised in that at least a part of the meat is pressed out through holes arranged in the main and/or secondary piston.

13. The method as claimed in claim 1, characterised in that the meat is pressed out through apertures in the pressure chamber at least a part of which apertures are scraped by a piston in between subsequent pressing sequences.

14. A device for separating meat from bones by subjecting the bones to a pressure of 10-500 bar, comprising:
- a pressure chamber for holding the bones to be processed;
- pressure means to selectively change the pressure on the bones in the pressure chamber;
- displacement means additional to the pressure means for changing the relative position of at least a selection of the bones in the pressure chamber; and
- a secondary piston having a diameter smaller than the diameter of the cylinder that is movable into the cylinder shaped pressure chamber.

15. The device as claimed in claim 14, characterised in that the pressure chamber is cylinder shaped with a circumference wall and an end wall.

16. The device as claimed in claim 15, characterised in that the pressure means comprises a main piston sealingly movable in the circumference wall towards and away from the end wall.

* * * * *